United States Patent
Baron et al.

(10) Patent No.: US 11,941,064 B1
(45) Date of Patent: Mar. 26, 2024

(54) MACHINE LEARNING COMPARISON OF RECEIPTS AND INVOICES

(71) Applicant: Bottomline Technologies, Inc., Portsmouth, NH (US)

(72) Inventors: Anne Baron, Ansonia, CT (US); John Canneto, Rye, NY (US); Michael Marcinelli, North Andover, MA (US); Jonathan Hewitt, Exeter, NH (US); Cobie Chin, Center Conway, NH (US)

(73) Assignee: Bottomline Technologies, Inc., Portsmouth, NH (US)

( * ) Notice: Subject to any disclaimer, the term of this patent is extended or adjusted under 35 U.S.C. 154(b) by 163 days.

(21) Appl. No.: 17/168,558

(22) Filed: Feb. 5, 2021

Related U.S. Application Data (60) Provisional application No. 62/976,407, filed on Feb. 14, 2020.

(51) Int. Cl.
| | | |
|---|---|---|
| *G06F 16/904* | (2019.01) | |
| *G06F 40/284* | (2020.01) | |
| *G06N 20/00* | (2019.01) | |
| *G06V 30/412* | (2022.01) | |

(52) U.S. Cl.
CPC .......... *G06F 16/904* (2019.01); *G06F 40/284* (2020.01); *G06N 20/00* (2019.01); *G06V 30/412* (2022.01)

(58) Field of Classification Search
CPC ..... G06F 16/904; G06F 40/284; G06N 20/00; G06V 30/412
See application file for complete search history.

(56) References Cited

U.S. PATENT DOCUMENTS

| | | | |
|---|---|---|---|
| 5,479,602 | A | 12/1995 | Baecker et al. |
| 5,481,741 | A | 1/1996 | Mckaskle et al. |
| 5,657,049 | A | 8/1997 | Ludolph et al. |
| 5,794,206 | A | 8/1998 | Wilkinson et al. |
| 5,847,953 | A | 12/1998 | Sojoodi et al. |
| 6,005,570 | A | 12/1999 | Gayraud et al. |

(Continued)

FOREIGN PATENT DOCUMENTS

| | | |
|---|---|---|
| CN | 104809171 A | 7/2015 |
| DM | 086083 | 2/2015 |

OTHER PUBLICATIONS

Ambrogi, Robert, Wolters Kluwer Brings Machine Learning to Legal Invoice Analysis, LawSites blog, Mar. 29, 2017, found at https://www.lawsitesblog.com/2017/03/wolters-kluwer-brings-machine-learning-legal-invoice-analysis.html on Jan. 22, 2019.

(Continued)

*Primary Examiner* — Apu M Mofiz
*Assistant Examiner* — Husam Turki Samara
(74) *Attorney, Agent, or Firm* — Downs Rachlin Martin PLLC (57) ABSTRACT

A legal spend management solution is described herein, a solution that utilizes improved machine learning algorithms to match lines of a legal invoice to lines in a receipt from a set of receipts. The matching uses cosine similarity algorithms and Levenshtein distances to determine whether there is a match between the receipt and the invoice lines. The machine learning results are displayed using a novel set of icons that present the confidence score with a set of three squares below a document icon.

10 Claims, 6 Drawing Sheets

(56) References Cited

U.S. PATENT DOCUMENTS

| | | | |
|---|---|---|---|
| 6,237,011 | B1 | 5/2001 | Ferguson et al. |
| 6,310,633 | B1 | 10/2001 | Graham |
| 6,559,867 | B1 | 5/2003 | Kotick et al. |
| 6,622,128 | B1 | 9/2003 | Bedell et al. |
| 6,631,496 | B1 | 10/2003 | Li et al. |
| 6,885,986 | B1 | 4/2005 | Heinemann et al. |
| 7,958,023 | B1 | 6/2011 | Shibayama |
| 8,744,934 | B1 | 6/2014 | McCrea |
| 8,775,242 | B2 | 7/2014 | Tavares et al. |
| 8,898,595 | B2 | 11/2014 | Cragun |
| D800,160 | S | 10/2017 | Shaw |
| 10,732,789 | B1 | 8/2020 | Marcinelli et al. |
| 10,929,415 | B1 | 2/2021 | Shcherbakov et al. |
| 11,288,453 | B1* | 3/2022 | Vinicombe ........... G06F 40/284 |
| 2001/0034675 | A1 | 10/2001 | Belford et al. |
| 2002/0002535 | A1 | 1/2002 | Kitchen et al. |
| 2003/0033226 | A1 | 2/2003 | Anderson |
| 2003/0110103 | A1 | 6/2003 | Sessek et al. |
| 2003/0195844 | A1 | 10/2003 | Hogan |
| 2004/0064389 | A1 | 4/2004 | Force et al. |
| 2005/0138631 | A1 | 6/2005 | Bellotti et al. |
| 2007/0088641 | A1 | 4/2007 | Arron et al. |
| 2007/0186175 | A1 | 8/2007 | Hudson, Jr. |
| 2007/0214068 | A1 | 9/2007 | Tadepalli et al. |
| 2008/0086413 | A1 | 4/2008 | Malloy et al. |
| 2008/0209342 | A1 | 8/2008 | Taylor et al. |
| 2008/0255972 | A1 | 10/2008 | Ulrich et al. |
| 2009/0089678 | A1 | 4/2009 | Sacco et al. |
| 2009/0106674 | A1 | 4/2009 | Bray et al. |
| 2010/0211486 | A1 | 8/2010 | Abrashkin et al. |
| 2011/0010278 | A1 | 1/2011 | Bulman et al. |
| 2011/0196768 | A1 | 8/2011 | Ulrich et al. |
| 2012/0185401 | A1 | 7/2012 | Marusyk |
| 2013/0117167 | A1 | 5/2013 | Iyer et al. |
| 2013/0261821 | A1 | 10/2013 | Lu et al. |
| 2016/0004714 | A1 | 1/2016 | Szymkowiak |
| 2016/0070432 | A1 | 3/2016 | Caporal et al. |
| 2016/0078659 | A1 | 3/2016 | Bartkiewicz et al. |
| 2016/0140529 | A1 | 5/2016 | Shaaban et al. |
| 2016/0349932 | A1 | 12/2016 | Gorny |
| 2017/0278132 | A1 | 9/2017 | Dennett et al. |
| 2018/0107676 | A1 | 4/2018 | Vora |
| 2018/0225851 | A1 | 8/2018 | Liu |
| 2018/0275862 | A1 | 9/2018 | Khoe et al. |
| 2018/0365248 | A1* | 12/2018 | Zheng .................. G06F 40/216 |
| 2019/0129582 | A1 | 5/2019 | Uchiumi |
| 2019/0149346 | A1 | 5/2019 | Shanmugam et al. |
| 2020/0057903 | A1* | 2/2020 | Leizerowich ...... H04N 5/23229 |
| 2020/0110792 | A1 | 4/2020 | Tsabba |
| 2020/0110796 | A1 | 4/2020 | Tsabba |
| 2020/0125224 | A1 | 4/2020 | Shim et al. |
| 2021/0133498 | A1* | 5/2021 | Zhang ................. G06K 9/6255 |

OTHER PUBLICATIONS

Hernandez, Gabrielle Orum, Inside Wolters Kluwer's Take on Machine Learning in E-Billing, Law.com blog, Apr. 9, 2017, found at https://www.law.com/2017/04/09/inside-wolters-kluwers-take-on-machine-learning-in-e-billing/?slreturn=20190022143039 on Jan. 22, 2019.

Legal Bill Review Reimagined, Wolters Kluwer website, found at https://www.wkelmsolutions.com/legalview-billanalyzer-savings-calculator on Jan. 22, 2019.

AI-powered IBM Outside Counsel Insights is here to help save insurance companies millions, IBM video and website found at https://mediacenter.IBM.com/media/AIpowered+IBM+Outside+Counsel+Insights+is+here+to+help+sa%20ve+insurance+companies+millions/1_56hk70vq on Feb. 10, 2019.

"Identify a list of items using Natural Language Processing", StackOverflow, May 2017, web page found at https://stackoverflow.com/questions/44112675/identify-a-list-of-items-using-natural-language-processing on Nov. 27, 2018.

Kusner, Matt J, et al, "From Word Embeddings To Document Distances", Proceedings of the 32nd International Conference on Machine Learning, Lille, France, 2015. JMLR: W&CP vol. 37.

Vogler, Raffael, "Comparison of String Distance Algorithms", Joy of Data blog, Aug. 21, 2013, webpage found at https://www.joyofdata.de/blog/comparison-of-string-distance-algorithms/ on Feb. 5, 2020.

Savev, Stefan, "Beyond Cosine Similarity", blog, Sep. 22, 2014, webpage found at https://stefansavev.com/blog/beyond-cosine-similarity/ on Feb. 5, 2020.

Polamuri, Saimadhu, "Five Most Popular Similarity Measures Implementation in Python", Dataaspirant, Apr. 11, 2015, webpage downloaded from https://dataaspirant.com/2015/04/11/five-most-popular-similarity-measures-implementation-in-python/ on Feb. 5, 2020.

Mayank, Mohit, "String similarity—the basic know your algorithms guide!", itnext, Feb. 2, 2019, webpage found at https://itnext.io/string-similarity-the-basic-know-your-algorithms-guide-3de3d7346227 on Feb. 5, 2020.

Bedtime Bulb logo by Kassymkulov Design on Dribbble, https://dribbble.com/shots/5851134-Bedtime-Bulb-logo.

Budicon Files (2) Icon Set, by Tanrim, iconfinder.com [online], published on Jun. 12, 2017, [retrieved on Nov. 16, 2020], retrieved from the Internet <URL: https://www.iconfinder.com/iconsets/budicon-files-2> (Year: 2017).

Bulb, Lamp, Light, Light Bulb, Torch Icon, by Aftabur, stock.adobe.com [online], published on or before Nov. 6, 2019, [retrieved on Nov. 12, 2020], retrieved from the Internet <URL: https://stock.adobe.com/300063469> (Year: 2019).

Cocktail Icon Stock Vector, by Nataliia, shutterstock.com [online], published on or before Aug. 22, 2017, [retrieved on Nov. 12, 2020], retrieved from the Internet <URL: https://www.shutterstock.com/image-vector/cocktail-icon-696974194> (Year: 2017).

Contract Terms Conditions Icon, by vectorstockcompany, depositphotos.com [online], published on Sep. 27, 2018, [retrieved on Mar. 8, 2021], retrieved from the Internet <URL: https://depositphotos.com/216883478/stock-illustration-contract-terms-conditions-icon-document.html> (Year: 2018).

Cyber Icons by Kirma, iconfinder.com [online], published on Feb. 28, 2019, [retrieved on Mar. 18, 2020], retrieved from the Internet <URL: https://www.iconfinder.com/iconsets/cyber> (Year: 2019).

Document File List, Application Form Icon, by Stmool, depositphotos.com [online], published on Jul. 1, 2018, [retrieved on Mar. 8, 2021], retrieved from the Internet <URL: https://depositphotos.com/202077360/stock-illustration-document-file-list-application-form.html> (Year: 2018).

Documents and Bookmarks Icon Set, by roundicons, iconfinder.com [online], published on Feb. 17, 2015, [retrieved on Nov. 16, 2020], retrieved from the Internet <URL: https://www.iconfinder.com/iconsets/documents-and-bookmarks-2> (Year: 2015).

Documents Icons, by Metroplicons, iconfinder.com [online], published on Feb. 9, 2016, [retrieved on Nov. 16, 2020], retrieved from the Internet <URL: https://www.iconfinder.com/iconsets/documents-24> (Year: 2016).

Electric Lightbulb Icon Stock Illustration, by bubaone, istockphoto.com [online], published on Oct. 9, 2019, [retrieved on Nov. 10, 2020], retrieved from the Internet <URL: https://www.istockphoto.com/vector/electric-lightbulb-icon-gm1180049972-3-30442081> (Year: 2019).

Empty Box, by Heinzen, dribbble.com [online], published on May 2, 2016, [retrieved on Mar. 20, 2020], retrieved from the Internet <URL: https://dribbble.com/shots/2687756-Empty-Box> (Year: 2016).

File Check File Icon, iconninja.com [online], published on Sep. 8, 2016, [retrieved on Nov. 16, 2020], retrieved from the Internet <URL: https://www.iconninja.com/files-check-file-icon-128395> (Year: 2016).

File Icon Set, by Icons Mind, iconfinder.com [online], published on Aug. 19, 2014, [retrieved on Nov. 16, 2020], retrieved from the Internet <URL: https://www.iconfinder.com/iconsets/files-3> (Year: 2014).

File Management Set One Icon Set, by Howcolour, iconfinder.com [online], published on Sep. 17, 2016, [retrieved on Nov. 16, 2020], retrieved from the Internet <URL: https://www.iconfinder.com/iconsets/file-management-set1> (Year: 2016).

(56) References Cited

OTHER PUBLICATIONS

File: Breezicons-actions-32-document-close.svg, by Kainz et al., commons.wikimedia.org [online], published on May 27, 2016, [retrieved on Nov. 16, 2020], retrieved from the Internet <URL: https://commons.wikimedia.org/wiki/File:Breezeicons-actions-32-document-close.svg> (Year: 2016).
Financial Documents, by Blankstock, depositphotos.com [online], published on Sep. 5, 2019, [retrieved on Mar. 9, 2021], retrieved from the Internet <URL: https://depositphotos.com/303179102/stock-illustration-financial-documents-hand-click-and.html> (Year:2019).
Flat Rounded Square Blue Gray on White Gradient Icon Sets, iconsetc.com [online], published on or before Sep. 23, 2015, [retrieved on Nov. 11, 2020], retrieved from the Internet <URL: iconsetc.com/?style=flat-rounded-square-blue-gray-on-white-gradient&type=icon-set> (Year: 2015).
WatchKit Icons—Files Icon Set, by Pixel Love Ltd., iconfinder.com [online], published on May 22, 2016, [retrieved on Nov. 17, 2020], retrieved from the Internet <URL: https://www.iconfinder.com/iconsets/files-18> (Year: 2016).
Whitepaper Icon, by Neves, shutterstock.com [online], available by Sep. 8, 2018 (as verified by TinEye), [retrieved on Mar. 8, 2021], retrieved from the Internet <URL: https://www.shutterstock.com/image-vector/whitepaper-icon-vector-thin-line-illustration-1137461747?> (Year: 2021).

\* cited by examiner

MACHINE LEARNING COMPARISON OF RECEIPTS AND INVOICES

BACKGROUND

Prior Application

This application is a non-provisional patent application that claims the benefit of U.S. Provisional Patent Application 62/976,407, filed on Feb. 14, 2020, "Machine Learning Comparison of Receipts and Invoices", the provisional application incorporated herein by reference in its entirety.

Technical Field

The system, apparatuses and methods described herein generally relate to machine learning, and, in particular, to machine learning techniques for matching receipts with invoices.

Description of the Related Art

Insurance companies are perhaps the largest consumer of legal services in the world, using law firms to manage and reduce the insurance payouts to claimants. With the magnitude of legal costs to the insurance companies, tight management of legal costs is paramount to maintaining profitability. As a result, insurance companies spend significant resources to manage litigation budgets. Billing guidelines instruct law firms what will or will not be paid, and legal bills are scrutinized for compliance with the guidelines.

A typical legal team will receive thousands of invoices a year. Reviewing these invoices manually is time-consuming and prone to error. The first stage in legal spend management is to automate the review of legal invoices, a process known as e-billing. Legal e-billing differs from a generic accounts payable (AP) system in a few ways and is essential for legal spend management:

Different billing guidelines—what firms can and cannot invoice for—exist for different firms. Trying to remember and accurately apply these rules when manually reviewing invoices is a daunting task and mistakes will slip through the net, resulting in overpayment. Legal e-billing systems allow the corporate legal team to set up rules and incoming invoices are reviewed and approved, rejected, or flagged for further review.

A legal invoice can contain hundreds of line items for different work and task codes. A standard AP system cannot track these effectively. An e-billing system allows law firms to submit standard format invoices, which enables the management and reporting of these task codes allows the legal team to analyze the costs of different work types, compare value across firms, and budget headcount and spend required for future work.

Most legal spend management tools also contain legal matter management features, which would not exist in an AP system. The matter data gives a fuller picture of legal work and its associated cost.

The applicant's specialized legal spend management tools incorporate machine learning to dissect the tasks performed by the law firm and compare those tasks with billing guidelines, rejecting invoices that do not conform with the billing guidelines. For example, see U.S. patent application Ser. No. 16/299,227, "Machine Learning Visualization", filed on Mar. 12, 2019 and U.S. patent application Ser. No. 16/213,475, "Visual and Text Patent Matching", filed on Dec. 7, 2018. Both applications incorporated herein by reference. While these tools handle the hourly tasks of the lawyers, disbursements have yet to be covered by automated tools due to the complexity of parsing the invoice and then matching receipts to the disbursements. Without disbursement management, there is no fully automated legal spend bill review. This document describes improvements to current legal spend management software to handle the processing of disbursements and receipts.

BRIEF SUMMARY OF THE INVENTION

A special purpose computer implemented method of visualizing a machine learning match of a receipt with a line of a document is described herein. The method includes the steps of (1) tokenizing the line of the document into a document vector of document tokens; (2) lemmatizing each token in the document vector of the document tokens, and storing the lemmatized document tokens in the document vector of the document tokens; and (3) creating a document term frequency inverse document frequency vector for the document vector of the document tokens. Next, (4) each receipt is reviewed by looping through one or more receipts in a set of receipts, (5) tokenizing a plurality of lines of the receipt into a receipt vector of receipt tokens, wherein the receipt vector includes a location indicator of the location of the receipt token in the receipt; (6) lemmatizing each receipt token in the receipt vector of the receipt tokens and storing the lemmatized receipt tokens in the receipt vector of the receipt tokens; (7) creating a receipt term frequency inverse document frequency vector for the receipt vector of the receipt tokens; and (8) comparing the document term frequency inverse document frequency vector to the receipt term frequency inverse document frequency vector using a cosine similarity algorithm to calculate a confidence score and storing the confidence score for each receipt. At the end of the looping, (9) determining a matching receipt by selecting the receipt with a highest confidence score; (10) displaying an indication of the highest confidence score with a variable icon; and (11) displaying the receipt associated with the highest confidence score.

The document could be a legal invoice, an expense report or a travel and entertainment report.

The method could also include the step of determining a Levenshtein Distance between an amount in the receipt line and an amount in the document line. The method could also include the step of determining a Levenshtein Distance between a date in the receipt line and a date in the document line. The method could also include the step of highlighting a line in the receipt with the highest confidence score.

The method could also include the step of comparing the document term frequency inverse document frequency vector to a billing guideline term frequency inverse document frequency vector using the cosine similarity algorithm to calculate a guideline confidence score and storing the guideline confidence score and displaying the indication of the guideline confidence score with the variable icon.

The variable icon could display a different number of items depending upon a magnitude of the highest confidence score. This may mean that the variable icon displays three solid squares (or simply three squares) under a document icon based on one range of the highest confidence score and/or that the variable icon displays one solid square (or simply one square) under the document icon based on a second range of the highest confidence score.

An apparatus for visualization of a machine learning confidence score is also described herein. The apparatus is made up of a display screen, a special purpose computer electrically connected to the display screen, a large capacity data storage facility with a set of billing review guidelines in term frequency inverse document frequency vectors, and a user interface display module operating on the special purpose computer and displaying an indication of the confidence score on the display screen. The apparatus also includes a natural language processing module operating on the special purpose computer and interfacing with the user interface display module to convert a textual description into a document table of term frequency inverse document frequencies, the natural language processing module further converting a plurality of receipts into a plurality of receipt tables of term frequency inverse document frequencies. The apparatus further includes a machine learning module, operating on the special purpose computer and interfacing with the natural language processing module to convert the billing guideline vectors and the document table into a guideline confidence score, the machine learning module further converts the document table and the plurality of receipt tables into a highest receipt confidence score. In the apparatus, the user interface display module operating on the special purpose computer and interfacing with the natural language processing module to display the highest receipt confidence score with a variable icon and the receipt associated with the highest receipt confidence score.

The variable icon could also display a different number of items depending on a magnitude of the guideline confidence score.

The machine learning module could convert the billing guideline vectors and the document table into the guideline confidence score using a cosine similarity algorithm.

The machine learning module could convert the plurality of receipt tables and the document table into the highest receipt confidence score using a cosine similarity algorithm.

DETAILED DESCRIPTION

In the field of legal spend management, auditors are hired to review every legal bill sent to an insurance company, or other entity, to assure that the billing adheres to contractual billing guidelines. This task of reviewing invoices requires trained auditors, often lawyers themselves, performing a tedious task of reading each line of each legal bill for compliance, and examining every receipt to approve disbursements. The reviewers vary in their interpretation due to the personalities of each auditor, creating inconsistencies in the review process. In addition, the labor costs of reviewing legal bills is high.

As a result, the Applicant's legal spend management technology has started to use rule based heuristics and machine learning analysis of legal invoices to lower costs and provide a consistent interpretation. While machine learning provides an improvement over human review and heuristic determinations, in the analysis of the highly variable text in the invoices, supervised machine learning is far from easy to use. And the situation only gets more complex when receipts and disbursements are included in the analysis.

The present inventions provide a user interface that simply presents the machine's determination, both in terms of acceptance or rejection of an invoice disbursement, and also provides an indication of the machine's confidence in the determination.

While the example below uses legal invoices, the present inventions could be applied to medical bills, fleet maintenance bills, travel and entertainment reports, expense reports, or any other type of invoices. Furthermore, any type of supervised machine learning could benefit from the user interface and algorithms described herein. The narrative description 112 could explain the tasks of a lawyer, a court reporter, an independent adjustor, an accountant, and engineer, an expert witness, or any number of other worker. And the expenses in the narrative 112 could include court fees, USPTO fees, copying, expert witness fees, airfare, hotel, food, entertainment, fuel, mileage, phone, or any number of other disbursements.

Figure 1:
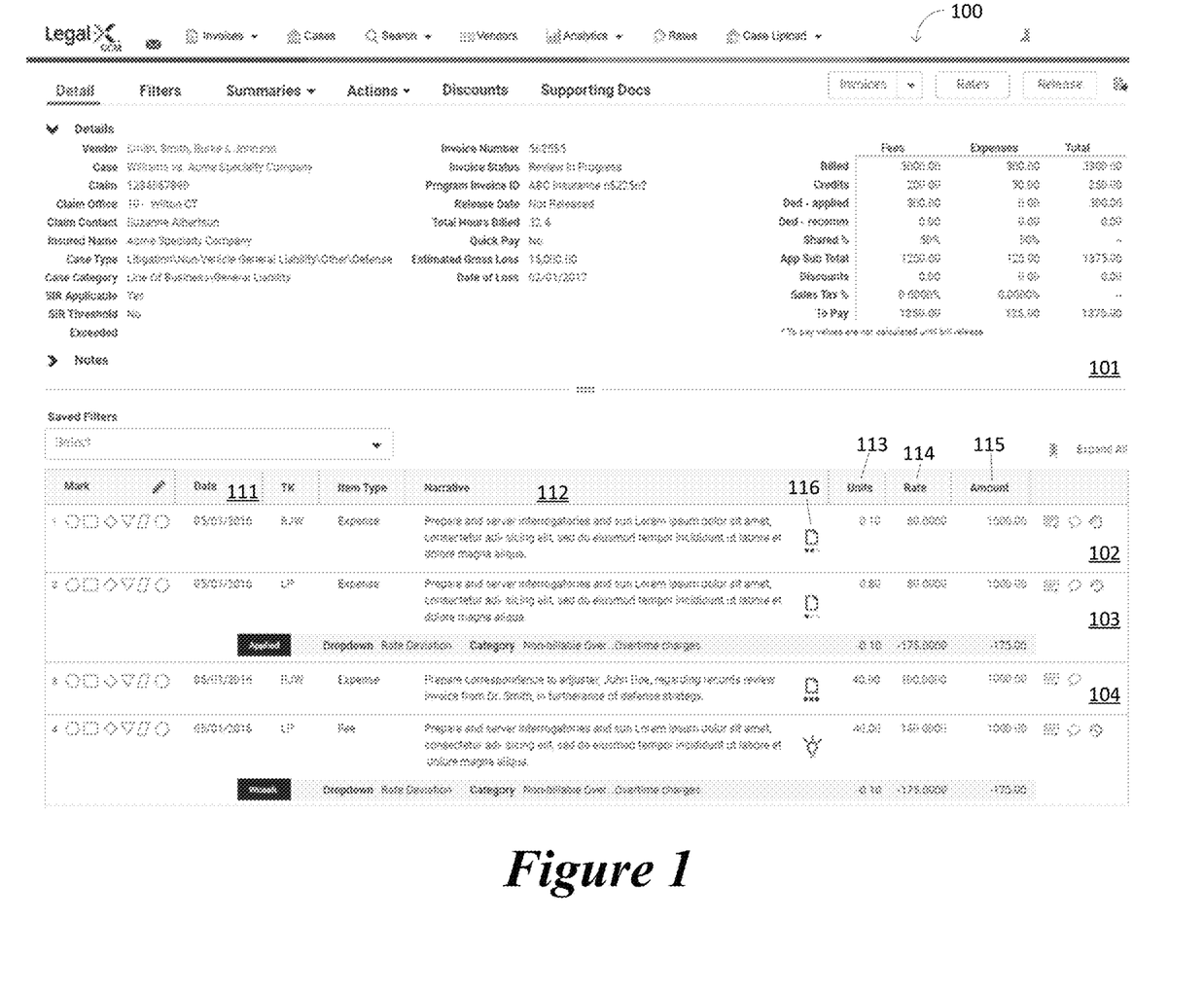
FIG. 1 is a screen shot of a legal invoice with the confidence score indication on several disbursements.

Looking to FIG. 1, we see a portion of a legal invoice 100 that has been processed by a machine learning model. The top portion of the invoice 101 covers vendor and case information, as well as a summary of the fees and expenses for the case. This bottom portion of the invoice is a table of four rows 102, 103, 104 (in this example), where each row is an individual time card entry for fees or an entry for a different disbursement 102, 103, 104. Each entry has a date 111, a narrative 112, a number of units 113, a rate 114, an amount 115, and other columns. There are a number of types of analysis that can be performed that are not described herein, for instance assuring that the dates 111 are within a range or that the calculations of the amount 115 are correct.

Much of the analysis of the fees portion of this type of invoice is described in U.S. patent application Ser. No. 16/299,227, "Machine Learning Visualization", filed on Mar. 12, 2019 and U.S. patent application Ser. No. 16/213,475, "Visual and Text Patent Matching", filed on Dec. 7, 2018. Other types of invoice analysis can be found in U.S. patent application Ser. No. 16/600,613, "Partial Perceptual Image Hashing for Invoice Deconstruction", filed on Oct. 14, 2019. All three patent applications are incorporated herein by reference.

In the example invoice 100 in FIG. 1, a receipt 501 is attached to each expense. The receipt provides support for the expense. The legal spend management software analyses the narrative 112 of the expense to see if it covers an allowable expense. For instance, one insurance company billing rules may prohibit expensing lunch expenses. So if the narrative 112 describes a lunch, the expense is denied. In another example, a court reporter may be hired to prepare a transcript of a short phone call. In the hypothetical example, the reported charges 0.8 hours when the guidelines limit payment to 0.70 hours for transcribing a short call. The denial in line 103 can be seen, where the rate deviated from the billing guidelines, and the expense amount is reduced by $175.00. A machine learning confidence score 116 is displayed showing how confident the machine learning is in its determination. For line 103, there is one solid square under the receipt icon, indicating that the machine learning had little confidence in its determination. Line 104 has all three squares solid, indicating high confidence in the machine's determination.

Figure 2:
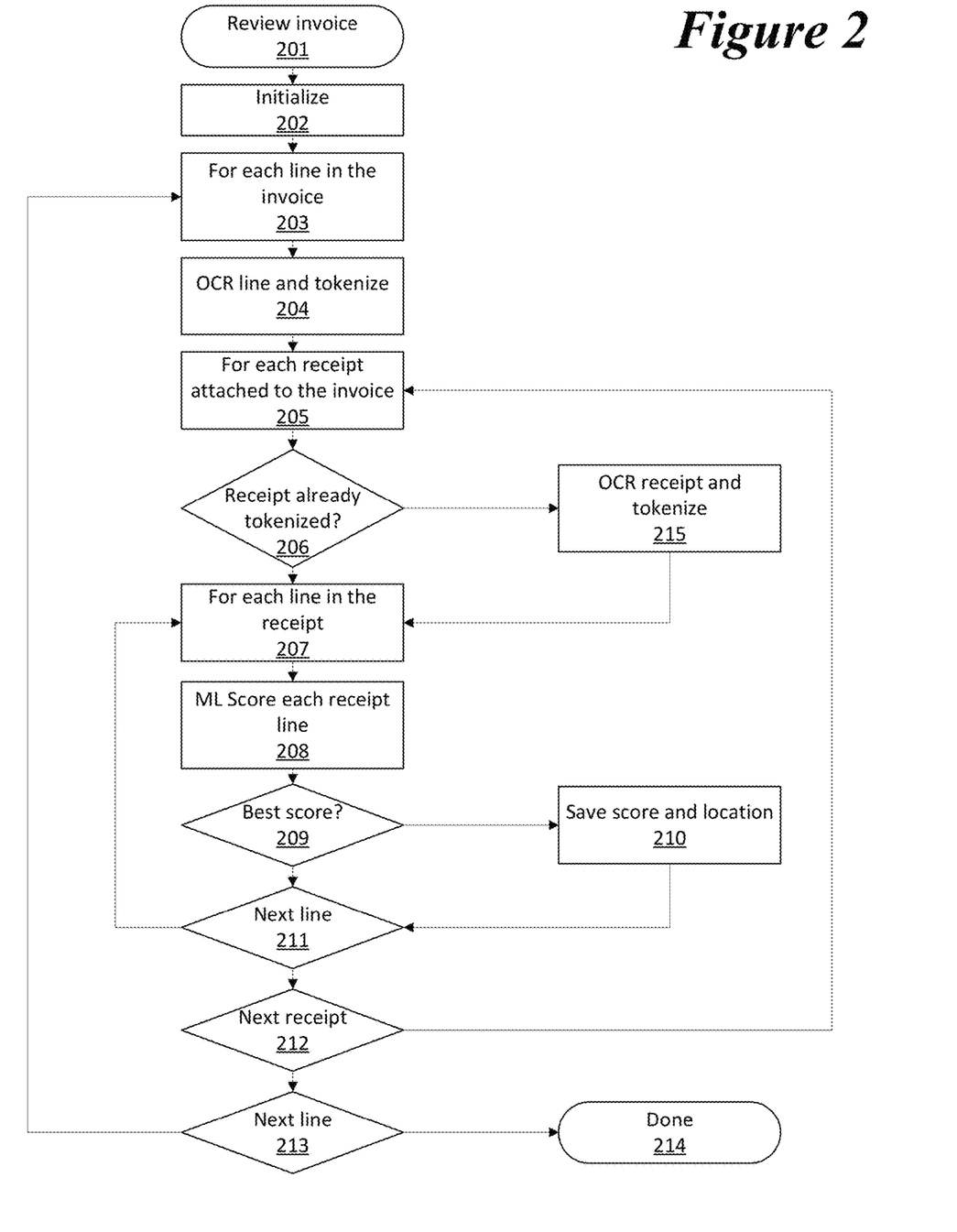
FIG. 2 is a flow chart showing the review of an invoice with specific focus on disbursement analysis.

FIG. 2 is a flow chart of the analysis of an invoice 100. The invoice review process 201 begins by initializing 202 the variables, loading the billing guidelines as a plurality of vectors of tokens representing each rule related to disbursements, and locating on the invoice where the itemized lines begin. The flow chart then loops through the invoice processing each line of the invoice 203.

The processing for each line starts by converting the image of the line into text 204, if necessary, using an optical character recognition algorithm. Next the text of the invoice line is tokenized using compiler technology into a document vector of words (an array). This could use traditional parsing techniques of searching for delimiters such as spaces, periods, tabs, commas, and other punctuation types. The strings between the delimiters are stored in a table. In some embodiments, Amazon's AWS Textract feature could be used to extract data from the invoice (and the receipt).

If this line of the invoice is an expense, we address it below. Hourly fee processing is discussed in U.S. patent application Ser. No. 16/299,227, "Machine Learning Visualization", filed on Mar. 12, 2019 and U.S. patent application Ser. No. 16/213,475, "Visual and Text Patent Matching", filed on Dec. 7, 2018, and is not repeated here.

Each document token in the array is converted into its stem by removing parts of speech that are attached to the word, such as plurality. Some descriptions call finding this process lemmatization—figuring out the most basic form or lemma of each word in the sentence. In some embodiments, the stem is stored a separate field in the array, in other embodiments, the token is replaced with the stem. For some models, the word is categorized as a noun, verb, adverb, adjective, etc. This process is often referred to as natural language processing.

The stems are then processed by a term frequency inverse document frequency (TF-IDF) algorithm that produces a vector of stems and their weighted frequency of use in the line of the document. The frequency count for each stem is adjusted by the inverse document frequency factor to deemphasize frequently used words like "the", "a", "an", etc. In some embodiments, the inverse document frequency table is revised with each document and receipt processed. As the invoice or the receipt is analyzed, the frequency of the stems is added to a table of previously used stems, so that the machine learns which stems are common in the sets of documents processed by the system. In another embodiment, the frequently used words like "the", "a", "an", etc. are simply removed when tokenizing.

Next, the stem-frequency vector from the line of the invoice is combined with the plurality of vectors of stems from the billing guidelines, creating an array with 3 columns, the first with the stem, the second with weighted frequency of the stem in the invoice line, and the third with the weighted frequency of the stem in the billing guideline line, taking care not to duplicate stems. The cosine similarity of two frequency columns is then calculated. The cosine similarity can be calculated by:

$$\cos\theta = \frac{\sum_1^n (invoice_i billing_i)}{\sqrt{\sum_1^n (invoice_i^2) \sum_1^n (billing_i^2)}}$$

where invoice and billing are the stem-frequency vectors for the words used in the invoice line or in the billing guideline line. The result, cos θ, is a single number between 0 and 1 representing the similarity of the guideline line and the invoice line.

In another embodiment, a Jaccard Similarity algorithm could be used to compare the similarity of the two vectors. In this algorithm, the intersection of the invoice and receipt vector is calculated by counting the number of stems that are common between the two vectors. Next, the union of the invoice and receipt vector is calculated by summing the total number of stems in both vectors. Then the similarity score is calculated by dividing the intersection count by the union count.

$$similarity = \frac{|invoice \cap receipt|}{|invoice \cup receipt|}$$

After comparing the invoice line to each billing guideline vector, if there is a close match, the line of the invoice is disallowed with the text of the billing guideline and the confidence score icon from the cosine similarity algorithm are stored and displayed on the screen.

If the line of the invoice 102, 103, 104 is not disallowed based on the narrative text (in some embodiments, the receipts are reviewed even it disallowed), the algorithm looks for the matching receipt. With some embodiments, the receipt 501 is attached to the line of the invoice on entry, and the process for matching is not required. But in many other embodiments, a set of receipts accompanies the invoice. These receipts are looped through, looking for a match of the receipt, or a line of the receipt, that matches the line of the invoice 102, 103, 104.

For each receipt 205 in the set of receipts, we first check to see if the receipt has been tokenized 206 in an earlier pass through the set of receipts for another invoice line 102, 103, 104.

If the receipt has not been tokenized, the processing of the receipt starts by converting the image of the receipt into text 215, if necessary, using an optical character recognition algorithm. Next the text is tokenized using compiler technology into a vector of words (an array), while storing the location of the text on the receipt in terms of line number. This could use traditional parsing techniques of searching for delimiters such as spaces, periods, tabs, commas, and other punctuation types. The strings between the delimiters are stored in a table.

Each receipt token in the receipt vector is converted into its stem by removing parts of speech that are attached to the word, such as plurality. For some models, the word is categorized as a noun, verb, adverb, adjective, etc.

Figure 3:
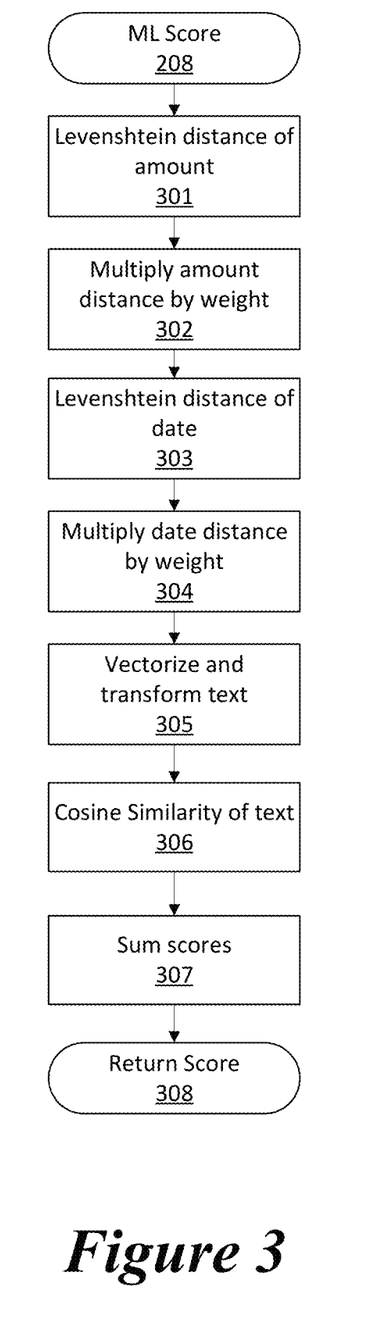
FIG. 3 is a flow chart of the determination of the machine learning score for a section of a receipt.

For each line in the receipt 207, a machine learning analysis 208, as described in FIG. 3, runs to create a confidence score for the receipt line. If the score is the best score for the invoice line 209, then the receipt name, the line of the receipt (location indication), and the confidence score are saved. Then the next line is processed 209, looping back to 207 until all lines of the receipt are processed 211.

Once all lines of the receipt are processed, the next receipt is processed 212, looping back to 205 until all receipts are processed. When all receipts have been processed, the best score (highest confidence score) and location, as found throughout this process, are saved for the invoice line 102, 103, 104, and the scores are converted into a variable icon for display on the screen 116. In one embodiment, the variable icon displays a document icon with one solid square beneath the document icon for a low confidence score range, two solid squares beneath the document icon for a medium confidence score, and three solid squares beneath the document icon for a high confidence score. See 116.

In another embodiment of the creation of the machine learning score 204-212 of the match between the receipt and the invoice line, the invoice line description is processed with a natural language processing algorithm 204, such as Stanford CoreNLP software, to extract the name entities and tokens of various parts of speech. Then the receipt is converted to text using an OCR tool 215, if it is not already processed 206. The OCR tool also returns an OCR confidence score representing the quality of the OCR process. The receipt is then compared line-by-line 207 to the tokens from the NLP analysis 208. The tokens are given different weights, with the name entities given one weight and the parts of speech given other weights in the comparison, and a comparison confidence score is calculated. The OCR confidence score is combined with the comparison confidence score for a machine learning score 208. If the receipt has the highest machine learning score 209 then the score and location are saved 210. This process loops all lines 207, 211 and through all receipts 205, 212. In some embodiments, the receipt comparison is done on a receipt page basis rather than a receipt line basis.

This process repeats for each line in the invoice 213. When the last line is processed, the invoice processing is complete 214.

FIG. 3 is a flow chart of the process of creating the machine learning score for the similarity of the line of the receipt with the line of the invoice, as sought in 208 of FIG. 2.

The algorithm begins by comparing the amount from the invoice line with the amount in the receipt line, using a Levenshtein distance algorithm 301 tuned to allow single digit differences. An exact match of the amounts would be a 1.00, and a single difference may be 0.20 in some embodiments, with a two or more Levenshtein distance returning a 0. The Levenshtein distance is multiplied by a weight for the amount 302, perhaps a 0.4 weight factor in some embodiments, and the weighted distance saved.

The algorithm next checks the dates by comparing the date from the invoice line with the date in the receipt line, using a Levenshtein distance algorithm 303. An exact match of the dates would be a 1.00, and a single difference may be 0.20 in some embodiments, with a two or more Levenshtein distance returning a 0. In some embodiments, the date is also converted to a number of days from a fixed point in time, and the absolute value of difference of the days are subtracted from 5 and then divided by 5 to achieve a distance score (this exercise handles the case where the month or year roll over, so that December 31 is close to January 1 even though the text has almost no matches). The largest of the text or the day count score is used as the Levenshtein distance. The Levenshtein distance is multiplied by a weight for the date 304, perhaps a 0.3 weight factor in some embodiments, and the weighted distance saved.

In other embodiments, other distance algorithms are used to find a distance between the amounts or dates. Other algorithms could include Hamming distance (the number of positions with the same symbol in both strings), Damerau-Levenshtein distance (Levenshtein distance with transposition of adjacent symbols allowed), restricted Damerau-Levenshtein distance (Damereau-Levenshtein distance but each sub string may be edited only once), longest common substring distance (minimum number of symbols to remove in both strings to make the substrings identical), g-gram distance (absolute differences between N-gram vectors of both strings), Jaccard distance (the division of the intersection count of two sets by the union count of the two sets), Jaro distance (complex formula), or Jaro-Winkler distance (the distance of finding similar character is 1 less than half of length of longest string).

Next, the receipt text is converted into a vector 305. Each word in the array (vector) is converted into its stem by removing parts of speech that are attached to the word, such as plurality. In some embodiments, the stem is stored a separate field in the array, in other embodiments, the token is replaced with the stem. The stems are then processed by a term frequency inverse document frequency algorithm that produces a vector of stems and their weighted frequency of use in the line of the document. The frequency count for each stem is adjusted by the inverse document frequency factor to deemphasize frequently used words, like "the", "a", "an", etc. This stem-frequency vector (array) is then sorted alphabetically by the stem text.

Then the cosine similarity algorithm 306 is run on the receipt stem-frequency vector and the invoice narrative stem-frequency vector to arrive at a similarity score. The stem-frequency vector from the line of the invoice is combined with the plurality of vectors of stems from the receipt lines, creating an array with 3 columns, the first with the stem, the second with weighted frequency of the stem in the invoice line, and the third with the weighted frequency of the stem in the receipt line. Note that if a stem exists in both lists, the frequency is associated with the stem, and stems are not duplicated. The cosine similarity of two frequency columns is then calculated. The cosine similarity can be calculated by:

$$\cos\theta = \frac{\sum_1^n (invoice_i receipt_i)}{\sqrt{\sum_1^n (invoice_i^2) \sum_1^n (receipt_i^2)}}$$

where invoice and receipt are the stem-frequency vectors for the words used in the invoice line or in the receipt line. The result, cos θ, is a single number between 0 and 1 representing the similarity of the receipt line and the invoice line.

In another embodiment, a Jaccard Similarity algorithm could be used to compare the similarity of the two vectors. In this algorithm, the intersection of the invoice and receipt vector is calculated by counting the number of stems that are common between the two vectors. Next, the union of the invoice and receipt vector is calculated by summing the total number of stems in both vectors. Then the similarity score is calculated by dividing the intersection count by the union count.

$$similarity = \frac{|invoice \cap receipt|}{|invoice \cup receipt|}$$

This similarity score is multiplied by a weight, say 0.3 in some embodiments, to obtain a weighted similarity score.

The weighted amount distance, date distance, and similarity scores are then summed 307 to calculate the machine learning score 308, a score the represents the similarity between the line of the invoice with the line in the receipt. In some embodiments, the date and amount comparisons are incorporated in the cosine similarity step rather than separate processing.

Figure 4:
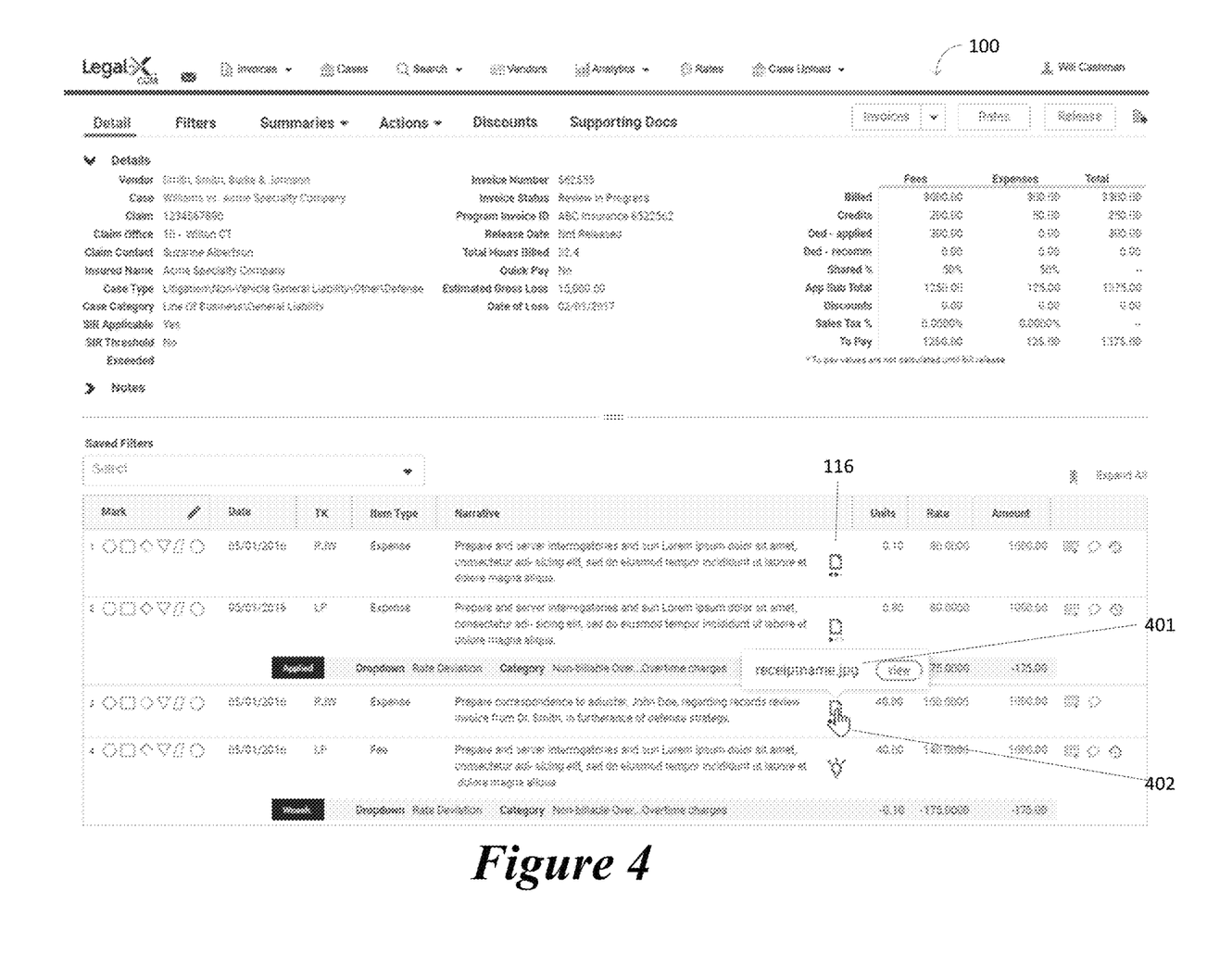
FIG. 4 shows a screen shot of the mouse over feature of the confidence score indicator.
Figure 5:
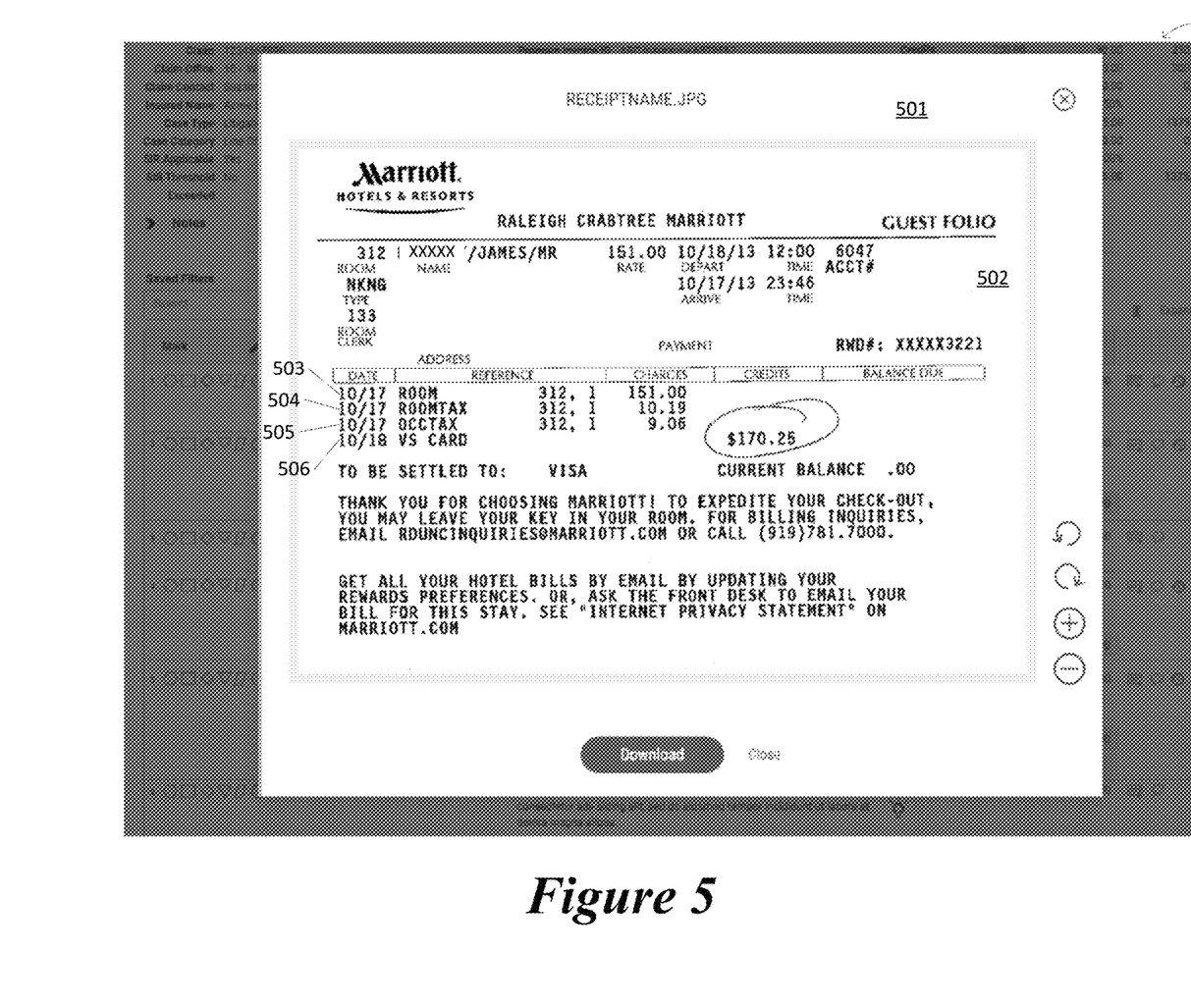
FIG. 5 is screen shot of a receipt overlaying an invoice.

FIG. 4 shows a screen displayed when the mouse 401 (or screen focus) floats over the machine learning confidence score icon 116. In this embodiment, a mouse-over causes the receipt name to pop up on the screen 401. Clicking on the receipt name 401 will cause the receipt 501 to pop up on the screen, as seen in FIG. 5. In some embodiments, clicking on the machine learning icon 402 allows the operator to provide feedback to the machine learning algorithm, indicating whether the machine got the analysis correct. This allows tuning of the algorithm.

In FIG. 5, we see the invoice 100 in the background. The receipt 501, pops up over the invoice 100. The invoice has a number of lines in the header 502, that need to be scanned to because in some instances the amount in the invoice is for the entire receipt, and the amount is in the header. In other cases, the amount and date may be in the lines of the receipt 503, 504, 505, 506. In some cases, the receipt is multiple pages, with numerous lines per page. Since the matching algorithm at 210 saved the receipt name and the line number in the receipt, when the receipt is display, the matching line is displayed in the center of the screen. In some embodiments, the matching receipt line is highlighted.

Figure 6:
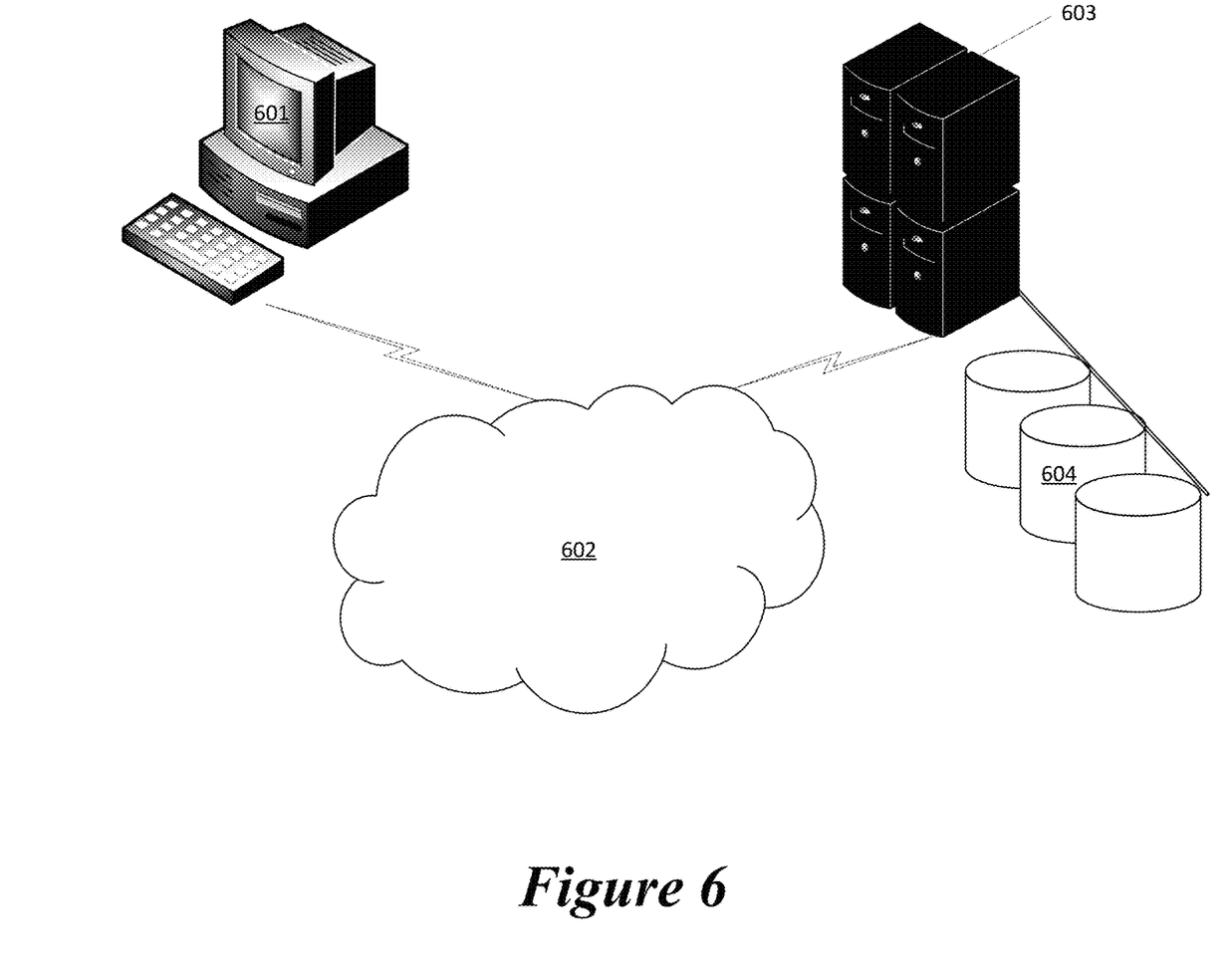
FIG. 6 is an electrical architecture of one embodiment.

Because of the complexities of machine learning algorithms, special purpose computing may be needed to build and execute the machine learning model described herein. FIG. 6 shows one such embodiment. The user views the user interface described here on a personal computing device such as a personal computer, laptop, tablet, smart phone, monitor, or similar device 601. The personal computing device 601 communicated through a network 602 such as the Internet, a local area network, or perhaps through a direct interface to the server 603. The server 603 is a high performance, multi-core computing device with significant storage facilities 604 (large capacity data storage facility) in order to store the training data for the model. Since this training data is continuously updated through the present inventions, this data must be kept online and accessible so that it can be updated. In addition, the real-time editing of the model as the user provides feedback to the machine requires significant processing power to rebuild the model as feedback is received.

The server 603 is a high performance computing machine electrically connected to the network 602 and to the storage facilities 604. In some embodiments, the server 603 is a special purpose computer. In other embodiments, the server 603 is combined with the personal computing device 601 into a special purpose computer.

Either the server 603 or the personal computing device 601 could have a display screen.

While the above described embodiment involves machine learning confidence scores, the algorithm could be used with confidence scores using other software techniques. For instance, it is envisioned that a heuristically based algorithm could also be used to analyze the narrative field.

The foregoing devices and operations, including their implementation, will be familiar to, and understood by, those having ordinary skill in the art. This algorithm is necessarily rooted in computer technology in order to overcome the problem of displaying machine learning reasoning with a simple interface in order to receive user feedback in the machine's determination of a confidence score.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

The invention claimed is:

1. A special purpose computer implemented method of visualizing a machine learning match of a receipt with a line of a document, the method comprising:
   tokenizing the line of the document into a document vector of document tokens;
   lemmatizing each token in the document vector of the document tokens, and storing the lemmatized document tokens in the document vector of the document tokens;
   creating a document term frequency inverse document frequency vector for the document vector of the document tokens;
   looping through one or more receipts in a set of receipts, reviewing each receipt, tokenizing a plurality of lines of the receipt into a receipt vector of receipt tokens, wherein the receipt vector includes a location indicator of the location of the receipt token in the receipt;
   lemmatizing each receipt token in the receipt vector of the receipt tokens and storing the lemmatized receipt tokens in the receipt vector of the receipt tokens;
   creating a receipt term frequency inverse document frequency vector for the receipt vector of the receipt tokens;
   comparing the document term frequency inverse document frequency vector to the receipt term frequency inverse document frequency vector using a similarity algorithm to calculate a confidence score and storing the confidence score for each receipt;
   determining a matching receipt by selecting the receipt with a highest confidence score;
   displaying an indication of the highest confidence score with a variable icon;
   displaying the receipt associated with the highest confidence score.

2. The method of claim 1 wherein the document is a legal invoice.

3. The method of claim 1 wherein the document is an expense report.

4. The method of claim 1 further comprising determining a Levenshtein Distance between an amount in the receipt line and an amount in the document line.

5. The method of claim 1 further comprising determining a Levenshtein Distance between a date in the receipt line and a date in the document line.

6. The method of claim 1 further comprising highlighting a line in the receipt with the highest confidence score.

7. The method of claim 1 wherein the variable icon displays a different number of items depending upon a magnitude of the highest confidence score.

8. The method of claim 7 wherein the variable icon displays three solid squares under a document icon based on one range of the highest confidence score.

9. The method of claim 7 wherein the variable icon displays one solid square under the document icon based on a second range of the highest confidence score.

10. The method of claim 1 further comprising comparing the document term frequency inverse document frequency vector to a billing guideline term frequency inverse document frequency vector using the similarity algorithm to calculate a guideline confidence score and storing the guideline confidence score; displaying the indication of the guideline confidence score with the variable icon.

\* \* \* \* \*